Figure 1:
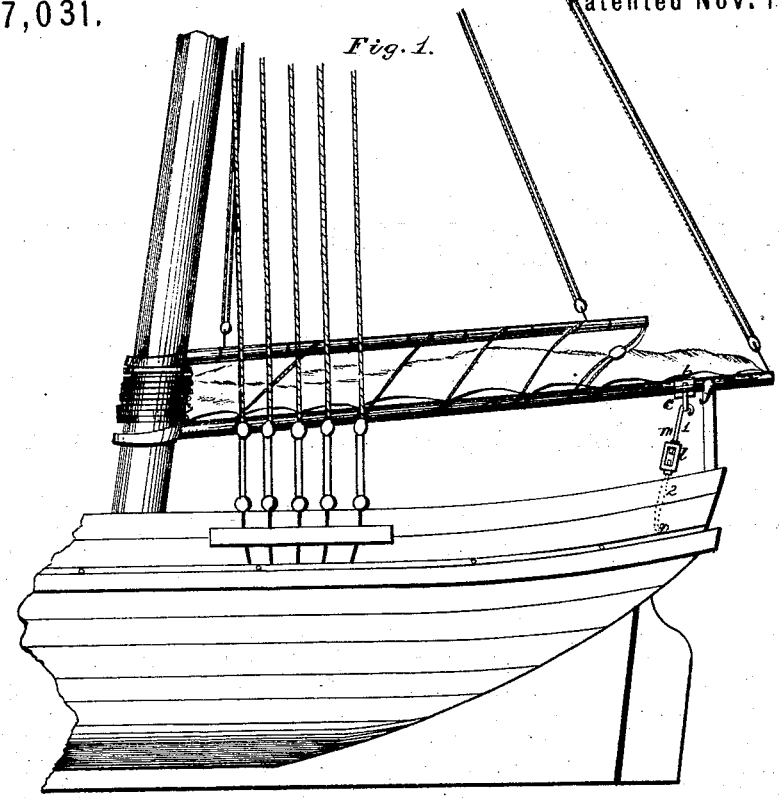
Figure 2:
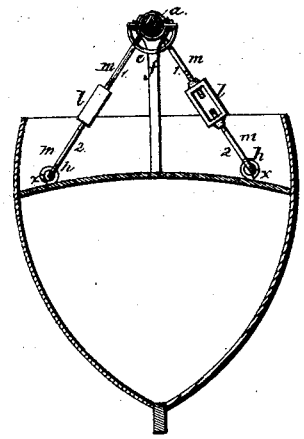

A. E. SMALL.
Boom-Crotch Supporters.

No. 157,031. Patented Nov. 17, 1874.

WITNESSES
J. W. Garner
T. F. Lehmann

INVENTOR
Alpheus E. Small
per F. A. Lehmann
Atty

UNITED STATES PATENT OFFICE.

ALPHEUS E. SMALL, OF GLOUCESTER, MASSACHUSETTS.

IMPROVEMENT IN BOOM-CROTCH SUPPORTERS.

Specification forming part of Letters Patent No. 157,031, dated November 17, 1874; application filed October 26, 1874.

*To all whom it may concern:*

Be it known that I, ALPHEUS E. SMALL, of Gloucester, in the county of Essex and State of Massachusetts, have invented certain new and useful Improvements in Boom-Crotch Supporters; and I do hereby declare the following to be a full, clear, and exact description of the invention, such as will enable others skilled in the art to which it pertains to make and use it, reference being had to the accompanying drawings, which form part of this specification.

My invention relates to an improvement in boom-crotch supporters; and consists in the arrangement and combination of devices, which will be more fully described hereafter.

The accompanying drawing represents my invention.

$a$ represents a boom, attached at one end to the mast of the vessel and having fastened near its other other end, just over the stern, the band $b$ and bail $c$. The boom is supported and held in the crotch $f$ by the two braces $m$, one of which is placed upon each side. Each of these braces consists of two parts, 1 2, united by means of the screw-coupling links $l$, and have formed upon their outer ends the hooks $h$, by which they are hooked at suitable places on the deck of the vessel into eye-bolts $x$, and also to the bail $c$. After the boom has been placed in the crotch a few turns of the links $l$ will tighten the braces upon each side, whereby the boom is drawn down into the crotch and firmly held in that position.

By means of these devices the boom can be more quickly and rigidly secured in position than by any of the means now employed, and are infinitely preferable on account of their simplicity, and always being ready for use.

Having thus described my invention I claim—

The combination of braces $l$, crotch $f$, band $b$, bail $c$, boom $a$, and eye-bolts $x$, substantially as shown and described.

In testimony that I claim the foregoing I have hereunto set my hand and seal this 17th day of October, 1874.

ALPHEUS E. SMALL. [L. S.]

Witnesses:
  CYRUS STORY,
  FRANK E. SMOTHERS.